United States Patent
Gilfix et al.

(10) Patent No.: US 7,549,581 B2
(45) Date of Patent: *Jun. 23, 2009

(54) MECHANISM FOR ENSURING AUTHENTICITY OF WRITTEN AND PRINTED DOCUMENTS

(75) Inventors: Michael A. Gilfix, Austin, TX (US); Tyron Jerrod Stading, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/057,877

(22) Filed: Mar. 28, 2008

(65) Prior Publication Data

US 2008/0230610 A1    Sep. 25, 2008

Related U.S. Application Data

(63) Continuation of application No. 11/126,114, filed on May 10, 2005, now Pat. No. 7,350,716.

(51) Int. Cl.
G06K 7/08 (2006.01)

(52) U.S. Cl. .................. 235/449; 235/493; 345/204

(58) Field of Classification Search .................. 235/449, 235/492, 380, 382, 494, 493; 345/55, 204
See application file for complete search history.

(56) References Cited

U.S. PATENT DOCUMENTS

| | | | |
|---|---|---|---|
| 5,495,929 A | 3/1996 | Batalianets et al. | |
| 5,623,347 A | 4/1997 | Pizzanelli | |
| 6,309,690 B1 | 10/2001 | Brogger et al. | |
| 6,381,344 B1 | 4/2002 | Smithies et al. | |
| 6,724,374 B1 | 4/2004 | Lapstun et al. | |
| 6,738,050 B2 | 5/2004 | Comiskey et al. | |
| 6,753,830 B2 | 6/2004 | Gelbman | |
| 6,806,453 B1 | 10/2004 | Vincent et al. | |
| 7,174,042 B1 * | 2/2007 | Simmons et al. | 382/187 |
| 7,198,341 B1 | 4/2007 | Rast | |
| 7,262,764 B2 | 8/2007 | Wang et al. | |
| 7,353,988 B1 * | 4/2008 | Ramachandran | 235/379 |
| 2002/0167500 A1 | 11/2002 | Gelbman | |
| 2003/0041774 A1 | 3/2003 | Auslander et al. | |
| 2003/0087068 A1 | 5/2003 | Chopra et al. | |
| 2003/0146286 A1 | 8/2003 | Berson | |
| 2004/0125988 A1 | 7/2004 | Coetzee et al. | |
| 2005/0219224 A1 | 10/2005 | Liebenow | |

(Continued)

OTHER PUBLICATIONS

"Electronic Ink Key Performance Benefits", E Ink Corp., Key Benefits, Version 051702, pp. 2 www.eink.com.

*Primary Examiner*—Edwyn Labaze
(74) *Attorney, Agent, or Firm*—Yee & Associates, P.C.; David A. Mims, Jr.

(57) ABSTRACT

A mechanism for ensuring the authenticity of written and printed documents. With the mechanism of the present invention, electronic ink is deposited onto a document, wherein the electronic ink deposited comprises at least one mark visible to a user. Current is applied to the electronic ink while the electronic ink is wet. The current is applied to the electronic ink in order to imprint a pattern in the ink. The electronic ink deposited on the document is then allowed to dry. The pattern in the electronic ink may then be examined to verify the authenticity of the document.

9 Claims, 2 Drawing Sheets

U.S. PATENT DOCUMENTS

| | | |
|---|---|---|
| 2005/0255435 A1 | 11/2005 | Redford et al. |
| 2006/0020469 A1 | 1/2006 | Rast |
| 2006/0022949 A1 | 2/2006 | Bathiche |
| 2006/0028451 A1 | 2/2006 | Bathiche |
| 2006/0080609 A1 | 4/2006 | Marggraff |
| 2006/0114500 A1 | 6/2006 | Ha |
| 2006/0159345 A1 | 7/2006 | Clary et al. |
| 2006/0159838 A1 | 7/2006 | Kowalski et al. |
| 2006/0169787 A1 | 8/2006 | Gelbman |
| 2006/0218171 A1 | 9/2006 | Wakeam et al. |
| 2006/0224610 A1 | 10/2006 | Wakeam et al. |
| 2006/0233464 A1 | 10/2006 | Simmons |
| 2006/0255123 A1 | 11/2006 | Gilfix |
| 2007/0024551 A1 | 2/2007 | Gelbman |

\* cited by examiner

MECHANISM FOR ENSURING AUTHENTICITY OF WRITTEN AND PRINTED DOCUMENTS

This application is a continuation of application Ser. No. 11/126,114, filed May 10, 2005, now U.S. Pat. No. 7,350,716.

BACKGROUND OF THE INVENTION

1. Technical Field

The present invention relates generally to document verification, and in particular, to a mechanism for ensuring authenticity of handwritten and printed documents.

2. Description of Related Art

In the current art, there are various mechanisms for verifying that a document was provided from the original party. For example, certificates of authenticity or holograms are used offer proof that a document is authentic. These certificates or holograms are typically attached to the document, an official stamp, or special paper used for printing. Written signatures are also used to provide another degree of authenticity. Written signatures are typically taken at face value, as handwriting is considered hard to forge.

However, as printing technology improve at a considerable rate, mechanisms for proving that a document is authentic have become increasingly important in raising the bar for forgers. Written documents also pose a problem, since forgers can imitate the handwriting and ink color to produce "official" looking documents. In view of the need for raise the bar to make forgery more difficult, this invention focuses on another mechanism that may be used to replace or augment some of these current authentication practices.

Thus, it would be advantageous to have an improved mechanism for ensuring the authenticity of written and printed documents.

SUMMARY OF THE INVENTION

The present invention provides a mechanism for ensuring the authenticity of written and printed documents. With the mechanism of the present invention, electronic ink is deposited onto a document, wherein the electronic ink deposited comprises at least one mark visible to a user. Current is applied to the electronic ink while the electronic ink is wet. The current is applied to the electronic ink in order to imprint a pattern in the ink, wherein the pattern is invisible to the user. The electronic ink deposited on the document is then allowed to dry. The pattern in the electronic ink may then be examined to verify the authenticity of the document.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
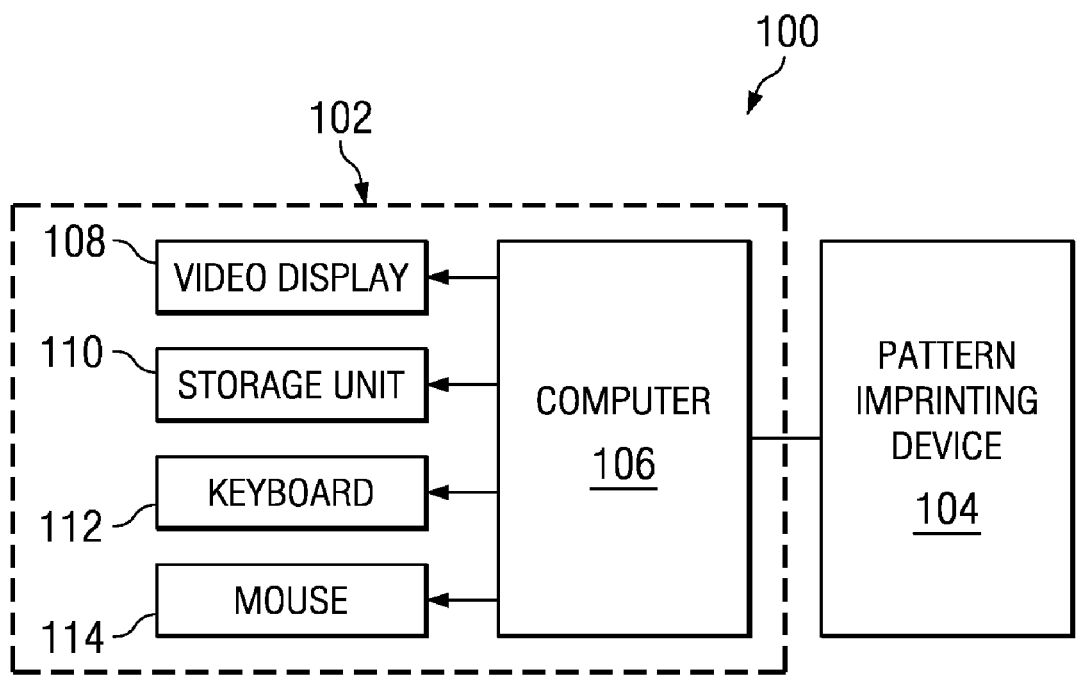
FIG. 1 depicts a pictorial representation of a pattern imprinting system in which the present invention may be implemented.

The present invention provides a mechanism for ensuring the authenticity of printed and handwritten documents. With the present invention, patterns may be embedded into electronic ink, which is a fluid material currently for use in electronic displays. Electronic ink contains magnetically charged pigments in the fluid that can be altered by applying current to the "ink". Traditionally, the ink is traditionally sandwiched between two glass substrates to keep it in a liquid state, and a positive or negative charge is applied to the ink to orient black and white pigments in a manner as to create the desired text or images on a surface.

The mechanism of the present invention improves upon existing electronic ink uses by using current to embed a pattern within the electronic ink. For example, when a document is marked (e.g., signed or printed) with electronic ink, that mark is visible to the naked eye. The present invention allows for creating a pattern within the visible electronic ink, wherein the pattern is invisible to the user. Thus, although the signature or print is visible to a user in a normal manner, the pattern itself is viewable to the user only with the aid of a magnification device.

The pattern within the ink may be embedded, for example, by using the current to generate magnetic charge fields to force some of the white pigments to the top surface of the ink. For instance, while particular pigment particles (e.g., a set of black pigments which together as a group are visible to the naked eye) are brought to the top to create a visible mark on the document, the colored pigments used for the pattern (e.g., a number of white pigments only visible under magnification) are pushed to the top surface only to form the desired pattern in the visible black pigment particles. Likely choices for the visible pigment color and pattern pigment color may be based on high contrast, i.e., black and white, blue and white, etc.

The pattern may be imprinted at a very high resolution to make the pattern invisible to the naked eye. A user may view the pattern with the assistance of a magnification device, such as a magnifying glass, microscope, or magnetic scanner. The pattern imprinted may be any pattern used to identify the signer or creator of the document, such as the document issuer's logo, or the person's name and date, for example. Once the pattern is imprinted within the ink, the document may be proven authentic by verifying the pattern under magnification.

With the present invention, electronic ink may be placed within a writing utensil, such as, for example, a pen or within an ink cartridge, or a combination of both. The writing utensil may be used to provide a handwritten signature to a document. The word "signature" as used herein shall mean any handwriting which is to be verified and can include a name, a group of code letters, or words, or symbols. The ink cartridge may be used in a printing device to provide a printed document.

In one embodiment of the present invention, when signing or issuing a document to be later verified, the signer is given the writing utensil containing the ink. At this point, the signer may sign the document in a normal manner either over a normal surface, or alternatively over a special surface capable of creating the current necessary to affect the ink. If the signer signs the document over a normal surface, the signed document is then placed over the special surface capable of creating the current necessary to affect the ink. When the document is adjacent to the special surface, the surface supplies a current to imprint a pattern within the ink. The document may then be left to dry, like a normal signed document, or the document may be cured with UV light. Once dry, one may verify the authenticity of the document by examining the pattern in the ink under magnification manually, or a magnetic scanner may be used to verify the imprinted pattern.

Similarly, in an alternative embodiment, a printer containing an ink cartridge filled with electronic ink may be used to deposit the ink onto the document. However, it should be noted that any mechanism may be used by the present invention to deposit the electronic ink onto a document.

With reference now to the figures and in particular with reference to FIG. 1, a pictorial representation of a pattern imprinting system in which the present invention may be implemented is depicted in accordance with a preferred embodiment of the present invention. In this illustrative example, pattern imprinting system 100 comprises a computer 102 and a pattern imprinting surface 104. Computer 102 is depicted which includes system unit 106, video display terminal 108, keyboard 112, storage unit 110, which may include floppy drives and other types of permanent and removable storage media, and mouse 114. Additional input devices may be included with personal computer 102, such as, for example, a joystick, touchpad, touch screen, trackball, microphone, and the like. Computer 102 may be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 102 may also include a graphical user interface (GUI) that may be implemented by means of systems software residing in computer readable media in operation within computer 102.

Pattern imprinting surface 104 may be connected to computer 102 via wire links, wireless communication links, or fiber optic cables. In the depicted example, pattern imprinting surface 104 is a surface that is capable of generating a current. When a document containing electronic ink is placed in the vicinity of the current, the current affects electronic ink by imprinting a pattern within the ink. Electronic ink will be described in more detail in FIG. 3.

Those of ordinary skill in the art will appreciate that the hardware depicted in FIG. 1 may vary. The depicted example is not meant to imply architectural limitations with respect to the present invention.

Figure 2:
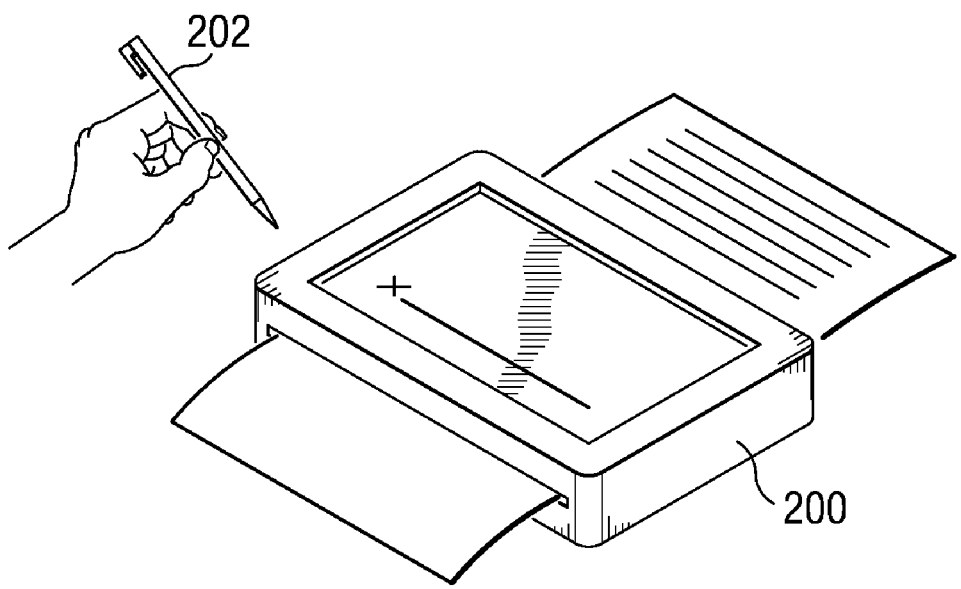
FIG. 2 is a block diagram of an example pattern imprinting system comprising a device having a surface for receiving a written signature and capable of generating current to affect the ink in accordance with a preferred embodiment of the present invention.

Turning now to FIG. 2, a block diagram of an example pattern imprinting surface in accordance with a preferred embodiment of the present invention. Pattern imprinting surface 200 may be implemented within pattern imprinting system 100 shown in FIG. 1. In this illustrative example, pattern imprinting surface 200 comprises a surface which receives a written signature. Writing utensil 202 is filled with electronic ink and is used to produce a written signature. As pattern imprinting surface 200 captures the handwritten input, the surface applies a current to the ink. The current is applied at any time before the ink dries and sets. For example, the current may be applied after the entire signature has been written, or, alternatively, the current may be applied while the ink is being placed on the document. The electronic ink is supplied the necessary current to affect the ink and embed a pattern. The necessary current may be very small, such as in the range of microAmperes, so as to have fine grain control over the pattern.

Although the foregoing description exemplifies one method of placing electronic ink onto a document, those skilled in the art after having the benefit of this disclosure, will realize that this is but one example of a way to apply electronic ink to a document, and this should be considered as exemplary and not limiting. For example, instead of using a writing utensil to apply electronic ink to the document, an ink cartridge may be used. In another example, instead of having the document placed over the special surface before the signature is written, the signature may be written first and then the special surface may be moved over or under the document to imprint a pattern in the ink. These are all considered to be within the spirit and scope of this invention.

Figure 3:
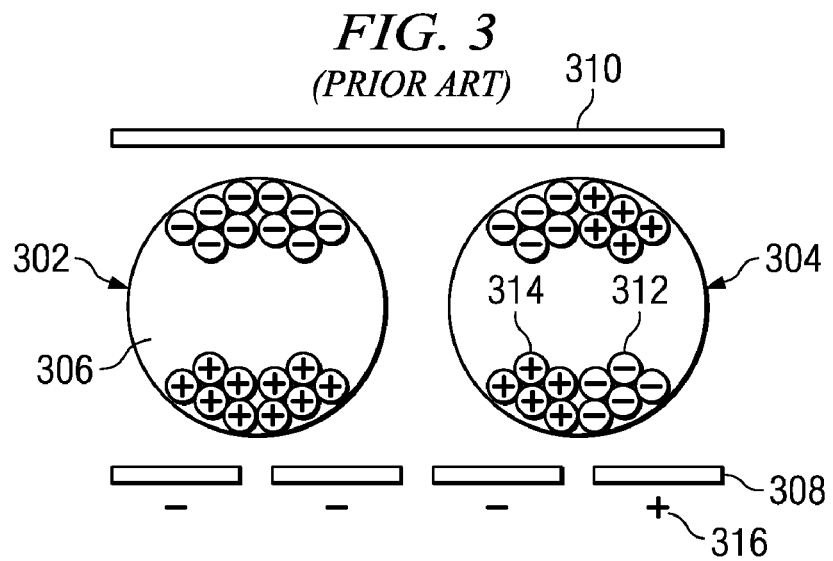
FIG. 3 is an illustration of a known electronic ink material.

Turning now to FIG. 3, an illustration of an exemplary known electronic ink material is shown. In particular, the electronic ink shown in FIG. 3 is a technology created by Eink Corporation. The electronic ink is comprised of microcapsules, such as microcapsules 302 and 304, which contain oppositely charged black and white pigment subcapsules floating in clear fluid 306. The microcapsules are sandwiched between bottom electrode 308 and top transparent electrode 310. In the depicted example, black pigment chips 312 are negatively charged, and white pigment chips 314 are positively charged. When a current is applied to the electronic ink, the pigments either rise to the top or fall to the bottom of the fluid, depending on the electrical charge. As shown, if bottom electrode 308 generates positive charge 316, the negatively charged black pigment chips 312 fall to the bottom of the fluid, while white pigment chips 314 float to the top. In this manner, the patterns of white and black pigments can then be created to form text and images.

Although the present invention is described with regards to "electronic ink", it should be noted that the term "electronic ink" in this invention comprises not only currently available inks such as that developed by Eink Corporation, but the present invention may be implemented using any technology that includes a fast drying, moderately viscous, clear fluid with flecks of colored magnetic material. For example, when a thin amount of the fluid is applied to the paper, the magnetic imprint is put in place before the fluid dries. Using a fast drying fluid ensures that the material will quickly be stuck in place with the pattern. The consistency of the fluid could be chosen to minimize imprinting errors. In addition, the properties of the fluid will dictate how fast the pattern must be imprinted to lock the pattern in the ink before the ink dries.

Figure 4:
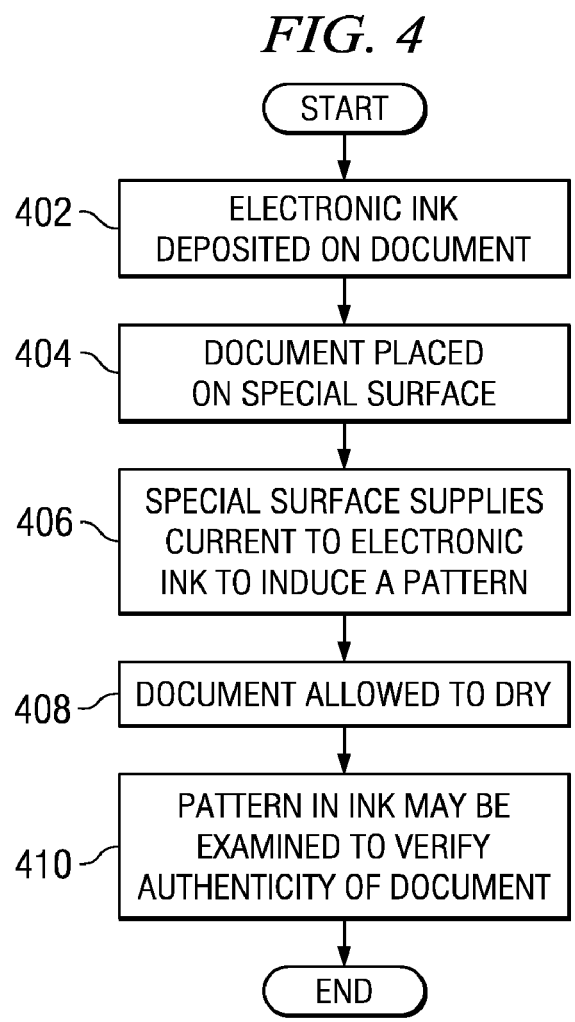
FIG. 4 is a flowchart of a process for ensuring authenticity of written and printed documents in accordance with a preferred embodiment of the present invention.

FIG. 4 is a flowchart of a process for ensuring authenticity of written and printed documents in accordance with a preferred embodiment of the present invention. The process described in FIG. 4 may be implemented in pattern imprinting system 100 in FIG. 1.

The process begins with the electronic ink being deposited onto the document (step 402). The ink may be deposited on the document in various ways, such as using a pen filled with electronic ink and to mark the document or using a printer to print the document, wherein an ink cartridge deposits the ink onto the document. The ink deposition may comprise, for example, a signature, text, or images on the document.

In one illustrative embodiment, the ink deposition is performed over a special surface capable of supplying current to the document. For example, if an electronic ink pen was used to sign the document, the document may be deposited with the ink while the document is positioned over the special surface. In an optional step, if the document has been deposited with ink prior to placing the document on the special surface, the special surface may then be placed over or under the document (step 404).

Next, while the document is adjacent to the special surface, and before the ink on the document has had time to dry, the special surface supplies a current to the document to imprint a pattern in the electronic ink (step 406). The current used is the electric current necessary to cause the pigments in the ink to generate a pattern.

The document is then allowed to dry (step 408). At this point, the authenticity of the document may then be verified by examining the pattern in the ink (step 410). Since the imprinted pattern may be of extremely high resolution, the document may be authenticated under magnification or magnetic scanning.

Thus, the present invention provides a mechanism for determining whether a document is valid or is a forgery. The mechanism of the present invention ensures the authenticity of printed and handwritten documents by applying current to electronic ink to cause patterns to be embedded into the ink. These patterns may then be used to verify that a document was provided by the original party.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for ensuring authenticity of written and printed documents, comprising:
    depositing means for depositing electronic ink onto a document, wherein the electronic ink deposited comprises at least one mark;
    applying means for applying a current to the electronic ink while the electronic ink is wet, wherein the current is used to imprint a pattern in the electronic ink, and wherein the pattern indicates the authenticity of the document; and
    allowing means for allowing the electronic ink deposited on the document to dry.

2. The system of claim 1, further comprising:
    examining means for examining the pattern in the electronic ink to verify the authenticity of the document.

3. The system of claim 1, wherein deposition of the electronic ink is performed using at least one of an electronic ink filled pen and an electronic ink filled cartridge.

4. The system of claim 1, wherein the current applied is the current necessary to cause pigments in the electronic ink to form the pattern.

5. The system of claim 1, wherein the pattern is invisible to the user.

6. The system of claim 1, wherein the pattern is a high resolution pattern.

7. The system of claim 6, wherein the high resolution pattern is examined under magnification to verify the authenticity of the document.

8. The system of claim 6, wherein the high resolution pattern is examined using a magnetic scanner to verify the authenticity of the document.

9. A recordable-type computer-readable medium having computer executable instructions for performing a process on a computer to ensure an authenticity of written and printed documents, the process comprising:
    depositing electronic ink onto a document, wherein the electronic ink deposited comprises at least one mark visible to the user;
    applying a current to the electronic ink while the electronic ink is wet, wherein the current is used to imprint a pattern in the electronic ink, and wherein the pattern is adapted for use in verifying the authenticity of the document; and
    allowing the electronic ink deposited on the document to dry.

* * * * *